United States Patent
Amini et al.

(10) Patent No.: US 12,381,796 B2
(45) Date of Patent: Aug. 5, 2025

(54) SAMPLING CONFIGURATIONS FOR ENVIRONMENTAL SENSORS

(71) Applicant: Cisco Technology, Inc., San Jose, CA (US)

(72) Inventors: Peiman Amini, Fremont, CA (US); Vishal Satyendra Desai, San Jose, CA (US); Ardalan Alizadeh, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1 day.

(21) Appl. No.: 17/968,304

(22) Filed: Oct. 18, 2022

(65) Prior Publication Data

US 2024/0129210 A1   Apr. 18, 2024

(51) Int. Cl.
*H04L 43/062* (2022.01)
*H04L 67/12* (2022.01)

(52) U.S. Cl.
CPC .......... *H04L 43/062* (2013.01); *H04L 67/12* (2013.01)

(58) Field of Classification Search
CPC ... H04L 43/062; H04L 67/12; H04L 41/0833; H04W 4/38; H04W 52/0235; H04W 52/0206; G06F 1/3234
See application file for complete search history.

(56) References Cited

U.S. PATENT DOCUMENTS

| | | | |
|---|---|---|---|
| 7,318,010 B2 * | 1/2008 | Anderson | H04W 52/0219 340/521 |
| 8,983,460 B2 * | 3/2015 | Trethewey | H04W 52/0254 455/434 |
| 9,325,516 B2 | 4/2016 | Pera et al. | |
| 10,257,236 B2 * | 4/2019 | Emmanuel | H04W 16/14 |
| 10,382,840 B2 * | 8/2019 | Branch | H04Q 9/02 |
| 10,887,001 B2 * | 1/2021 | Tofighbakhsh | H04B 7/18504 |
| 11,221,249 B2 * | 1/2022 | Gray, Jr. | G01C 13/008 |
| 11,275,366 B2 | 3/2022 | Mirfakhraei et al. | |

(Continued)

FOREIGN PATENT DOCUMENTS

| | | |
|---|---|---|
| KR | 20100090489 | 8/2010 |
| WO | 2022045851 | 3/2022 |

OTHER PUBLICATIONS

Algabroun, Hatem, "Dynamic sampling rate algorithm (DSRA) implemented in selfa-daptive software architecture: a way to reduce the energy consumption of wireless sensors through event-based sampling", Microsystem Technologies (2020) 26:1067-1074, Springer.

(Continued)

*Primary Examiner* — Alex H. Tran
(74) *Attorney, Agent, or Firm* — BEHMKE INNOVATION GROUP LLC; James M. Behmke (57) ABSTRACT

In one embodiment, a device may obtain sensor measurements from an environmental sensor of an access point. The device may obtain traffic telemetry data regarding network traffic handled by the access point. The device may generate, based on the sensor measurements and the traffic telemetry data, a sampling configuration of the environmental sensor of the access point. The device may cause the access point to collect additional sensor measurements from its environmental sensor according to the sampling configuration.

20 Claims, 6 Drawing Sheets

(56) References Cited

U.S. PATENT DOCUMENTS

| | | | |
|---|---|---|---|
| 11,659,025 B2* | 5/2023 | Po | H04L 67/125 709/226 |
| 11,678,262 B2* | 6/2023 | Fuleshwar Prasad | H04W 52/0206 370/311 |
| 11,811,721 B2* | 11/2023 | Pai | H04L 43/12 |
| 2019/0280940 A1* | 9/2019 | Furuichi | G06F 16/27 |
| 2020/0305049 A1* | 9/2020 | Vasseur | H04W 36/322 |
| 2020/0357270 A1* | 11/2020 | Oga | H04Q 9/00 |
| 2021/0289493 A1* | 9/2021 | Choi | H04W 72/542 |
| 2021/0344738 A1* | 11/2021 | Petrie | H04L 67/00 |
| 2022/0030334 A1 | 1/2022 | Stamatakis et al. | |
| 2022/0182451 A1* | 6/2022 | Wang | H04L 45/24 |

OTHER PUBLICATIONS

Monteiro Santos, Ivairton, "Dynamic definition of the sampling rate of data in Wireless Sensor Network with Adaptive Automata", IEEE Latin America Transactions (vol. 9, Issue: 6, Oct. 2011), pp. 963-968, IEEE.

Sood, et al., "Green Cloud Computing: Green Indexing of Cloud Network Resources", Technical Disclosure Commons, Defensive Publication Series, Aug. 2021, 16 pages.

Bruno, Luigi, "Multisensor Systems with Variable Sampling Rate", IASTED Signal and Image Processing and Application, Jun. 2011, 8 pages.

Sun, et al., "Optimum sampling in spatial-temporally correlated wireless sensor networks", EURASIP Journal on Wireless Communications and Networking 2013, 2013:5, 18 pages, Springer.

Bandyopadhyay, et al., "Spatio-Temporal Sampling Rates and Energy Efficiency in Wireless Sensor Networks", IEEE/ACM Transactions on Networking, vol. 13, No. 6, Dec. 2005, pp. 1339-1352.

Giouroukis, et al., "A Survey of Adaptive Sampling and Filtering Algorithms for the Internet of Things", DEBS '20: The 14th ACM International Conference on Distributed and Event-based Systems, Jul. 2020, 12 pages.

"Automatically Generating Notifications of Emergency Medical Events", Technical Disclosure Commons, Defensive Publication Series, Aug. 2020, 9 pages.

Price, Thomas, "Machine Learning to Identify Vehicle Maintenance Needs", Technical Disclosure Commons, Defensive Publications Series, Dec. 2017, 42 pages.

Felker, Nick, "Correcting Image Anomalies Using Machine Learning", Technical Disclosures Commons, Defensive Publications Series, Dec. 2017, 36 pages.

Florabäck, Johan, "Anomaly Detection in Logged Sensor Data", Chalmers University of Technology, Department of Applied Mechanics, Masters Thesis in Complex Adaptive Systems, 2015, 52 pages, Sweden.

Vanem, et al., "Unsupervised anomaly detection based on clustering methods and sensor data on a marine diesel engine", Jun. 2019, 24 pages.

Hill, et al., "Real-Time Bayesian Anomaly Detection for Environment Sensor Data", online: http://citeseerx.ist.psu.edu/viewdoc/download?doi=10.1.1.329.8262&rep=rep1&type=pdf, accessed May 17, 2022, 10 pages.

Conde, Erick F., "Environmental Sensor Anomaly Detection Using Learning Machines", Utah State University Digital Commons, All Graduate Theses and Dissertations, Dec. 2011, 95 pages.

Kim, et al., "Anomaly Detection of Environmental Sensor Data using Recurrent Neural Network at the Edge Device", 2020 International Conference on Information and Communication Technology Convergence (ICTC), Oct. 2020, pp. 1624-1628, IEEE.

Hayes, et al., "Contextual Anomaly Detection in Big Sensor Data", Western University, Electrical and Computer Engineering Publications, Jun. 2014, 9 pages, IEEE Big Data.

Hill, et al., "Anomaly detection in streaming environmental sensor data: A data-driven modeling approach", Environmental Modelling & Software 25 (2010), pp. 1014-1022, Elsevier.

* cited by examiner

SAMPLING CONFIGURATIONS FOR ENVIRONMENTAL SENSORS

TECHNICAL FIELD

The present disclosure relates generally to computer networks, and, more particularly, to sampling configurations for environmental sensors.

BACKGROUND

As the Internet of Things (IoT) continues to expand, environmental sensors are increasingly being deployed to a wide variety of environments. In turn, measurements from the environmental sensors may be used for purposes of monitoring the environment, controlling devices in the environment, or the like. For example, sensor measurements may be utilized as inputs to a building management platform to control building components such as lighting systems, access control systems, surveillance systems, etc.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device may obtain sensor measurements from an environmental sensor of an access point. The device may obtain traffic telemetry data regarding network traffic handled by the access point. The device may generate, based on the sensor measurements and the traffic telemetry data, a sampling configuration of the environmental sensor of the access point. The device may cause the access point to collect additional sensor measurements from its environmental sensor according to the sampling configuration.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to edge endpoints to provide computing, storage, and networking resources and services. Multiple edge nodes organized or configured together form an Edge system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, a edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
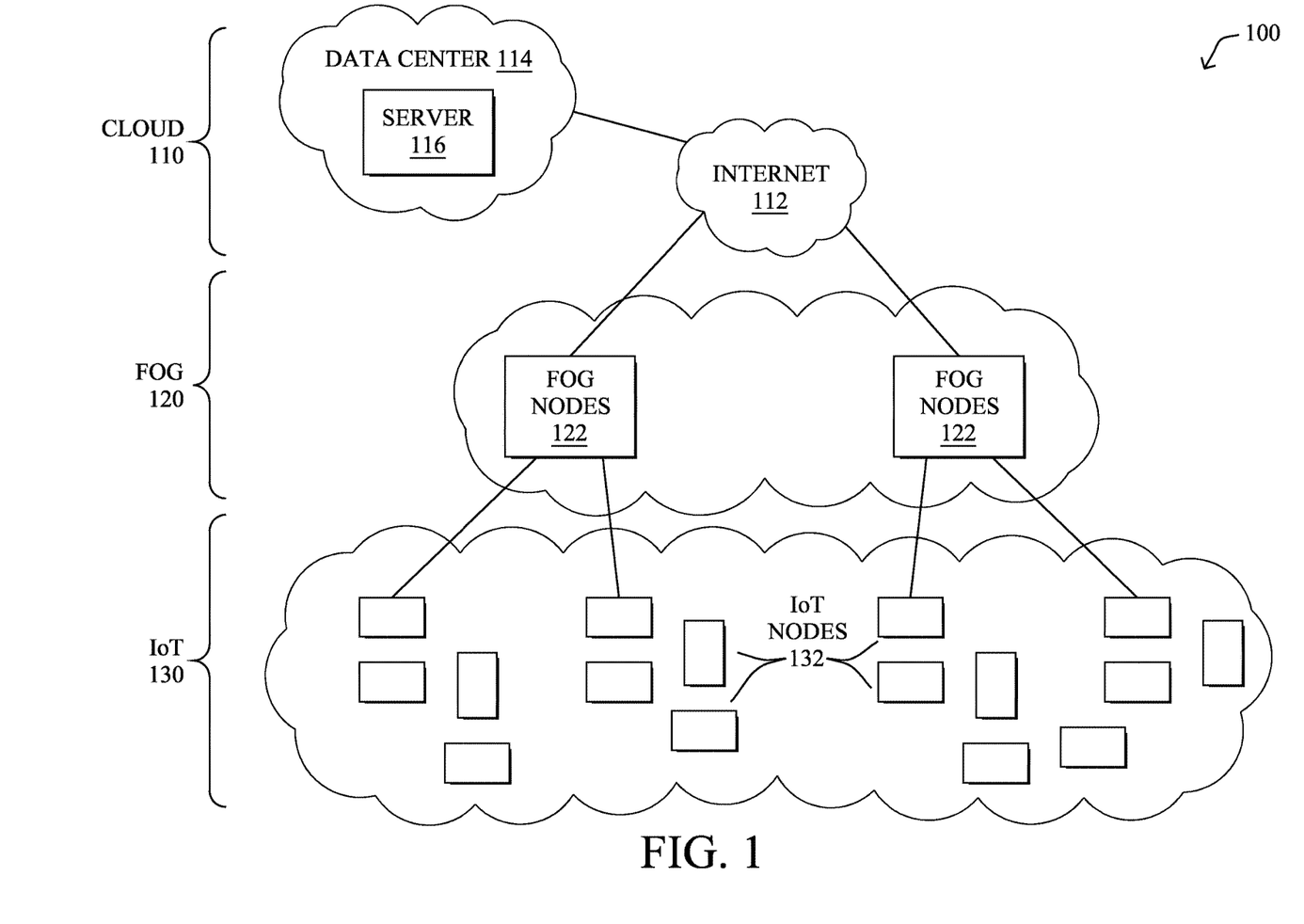
FIG. 1 illustrates a schematic block diagram of an example simplified computer network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, edge 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the edge layer 120, various edge nodes/devices 122 (e.g., with edge modules, described below) may execute various edge computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
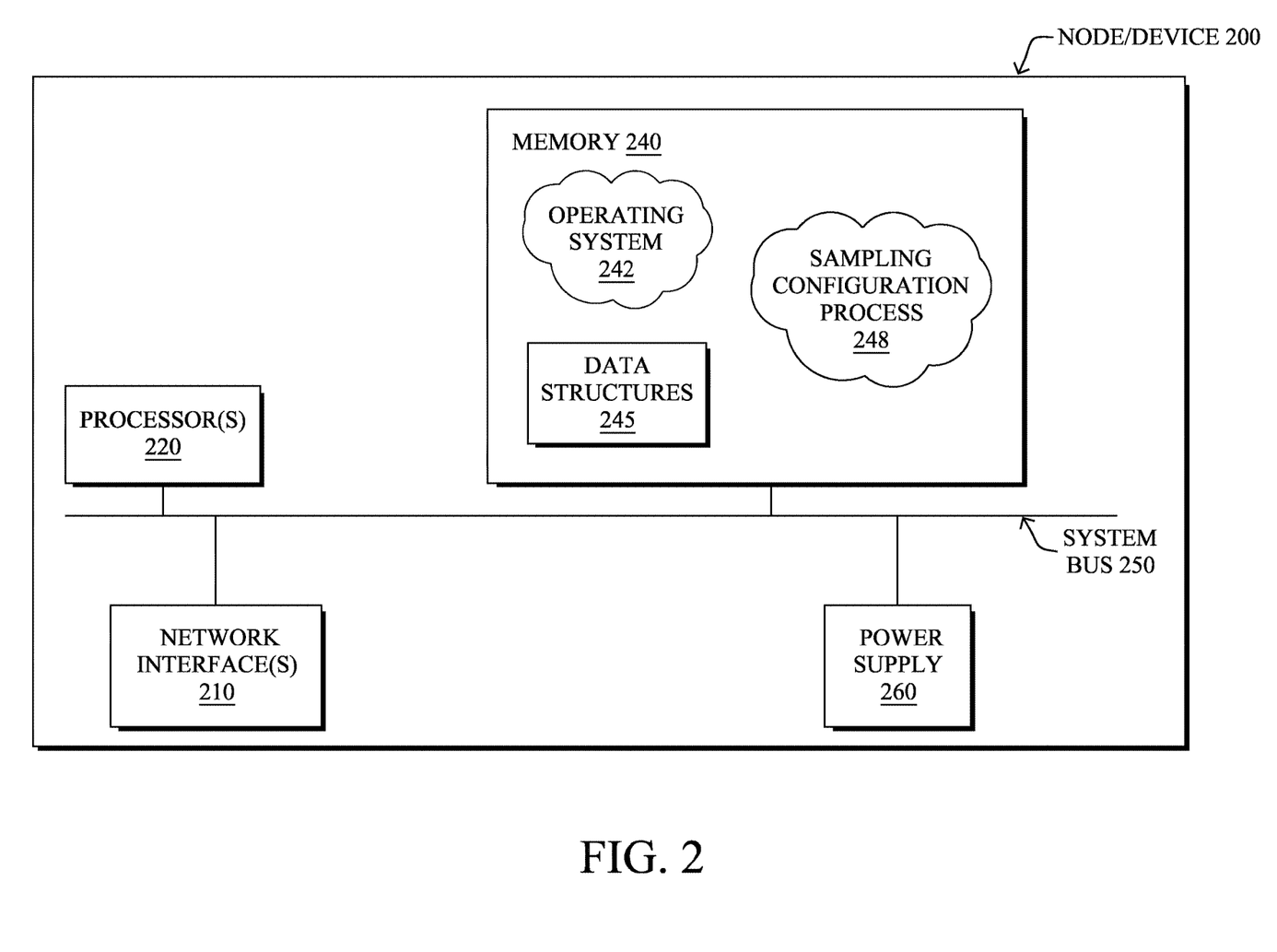
FIG. 2 illustrates a schematic block diagram of an example node/device.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data to and/or from a network. For example, network interface(s) 210 may include a wireless receiver, transmitter, or both (e.g., a transceiver).

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise a sampling configuration process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
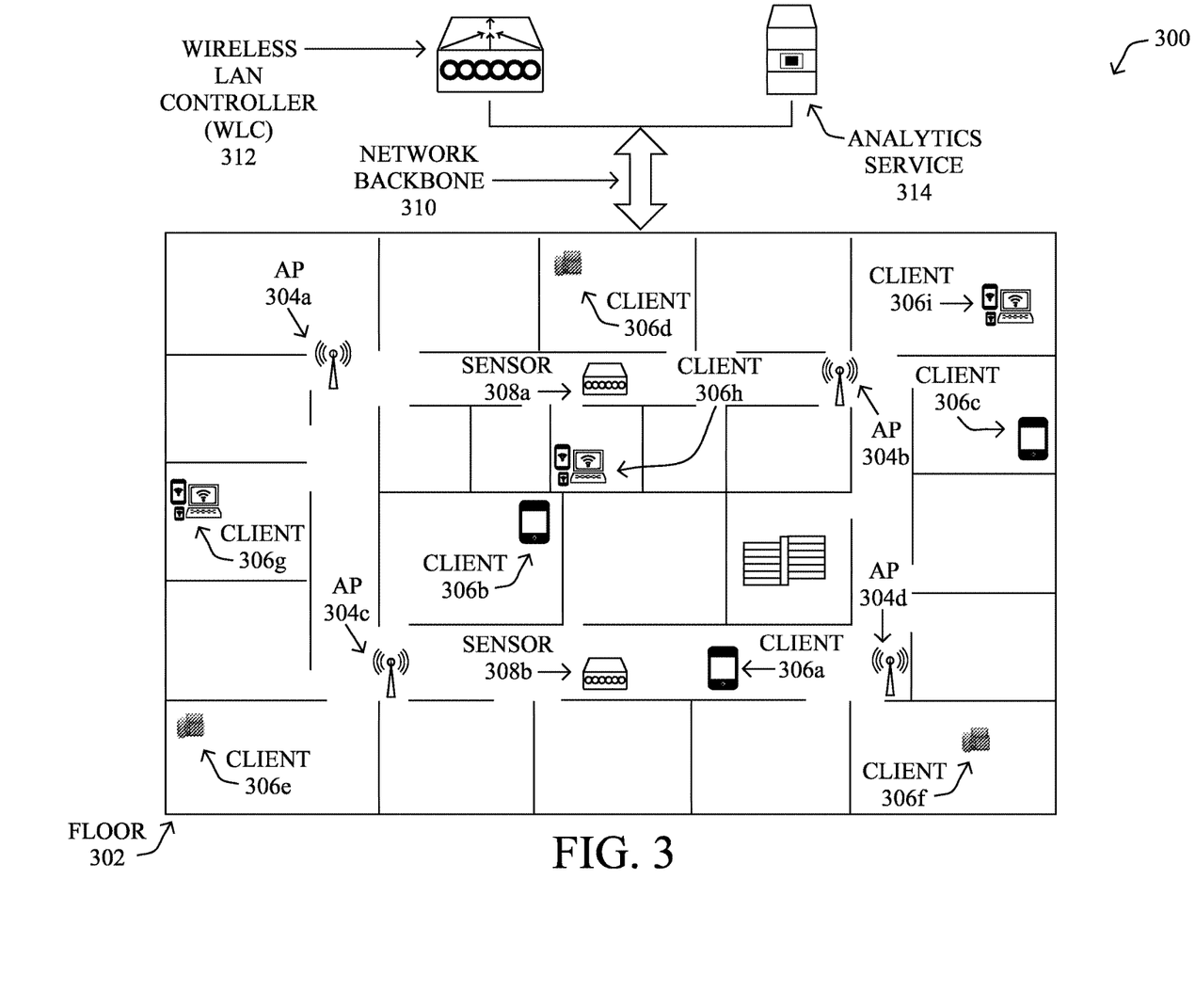
FIG. 3 illustrates an example wireless network.

FIG. 3 illustrates an example wireless network 300, according to various embodiments. Wireless network 300 may be deployed to a physical location, such as floor 302 shown, and may include various infrastructure devices. These infrastructure devices may include, for example, one or more access points (APs) 304 that provide wireless connectivity to the various wireless clients 306 distributed throughout the location. For illustrative purposes, APs 304*a*-304*d* and clients 306*a*-306*i* are depicted in FIG. 3. However, as would be appreciated, a wireless network deployment may include any number of APs and clients.

A network backbone 310 may interconnect APs 304 and provide a connection between APs 304 and any number of supervisory devices or services that provide control over APs 304. For example, as shown, a wireless LAN controller (WLC) 312 may control some or all of APs 304*a*-304*d*, by setting their control parameters (e.g., max number of attached clients, channels used, wireless modes, etc.). Another supervisory service that oversees wireless network 300 may be a monitoring and analytics service 314. Monitoring and analytics service 300 may measure and monitor the performance of wireless network 300 and, if so configured, may also adjust the operation of wireless network 300 based on the monitored performance (e.g., via WLC 312, etc.). Note that service 314 may be implemented directly on WLC 312 or may operate in conjunction therewith, in various implementations.

Network backbone 310 may further connect the infrastructure of the local network and a larger network, such as the Internet, a Multiprotocol Label Switching (MPLS) network, or the like. Accordingly, WLC 312 and/or monitoring and analytics service 314 may be located on the same local network as APs 304 or, alternatively, may be located remotely, such as in a remote datacenter, in the cloud, etc. To provide such connectivity, network backbone 310 may include any number of wired connections (e.g., Ethernet, optical, etc.) and/or wireless connections (e.g., cellular, etc.), as well as any number of networking devices (e.g., routers, switches, etc.).

The types and configurations of clients 306 in network 300 can vary greatly, ranging from powerful computing devices to any number of different types of IoT nodes/devices. For example, clients 306*a*-306*i* may include, but are not limited to, desktop computers, wireless sensors, actuators, thermostats, relays, mobile phones, other mobile devices, and the like.

Environmental sensors may collect sensor measurements by sampling their environment (e.g., floor 302). Environmental sensors may include, among other examples, temperature sensors, motion sensors, cameras, microphones, air pressure sensors, relative humidity sensors, gas sensors, volatile organic compound sensors, moisture sensors, facility monitoring sensors, equipment monitoring sensors, manufacturing/industrial process monitoring sensors, smoke sensors, air quality sensors, light sensors, contact sensors, pollution sensors, particle sensors, height sensor, air flow sensors, indoor air quality sensors, biosensors, biometric sensors, etc. In some instances, the sensor measurements collected by these sensors are utilized as part of a smart system such as a smart building management system, to make adjustments to devices associated with the environments and compile and/or report data trends. The sensor measurements may be communicated across wireless network 300.

In various embodiments, the environmental sensors may be integrated with any of APs 304. For example, an environmental sensor may be a component of the AP. For instance, an environmental sensor may be mounted near the body of the AP, to the body of the AP, and/or within the body of the AP. Therefore, an AP and an environmental sensor may share resources to perform their respective functions. As such, the functionality of the APs 304 may be supplemented by the functionality of the environmental sensors. For instance, the environmental sensors onboard an AP provide environmental metrics, such as indoor air quality metrics, occupancy metrics, security metrics, etc., via the AP to customers and/or smart building management platforms without necessitating the purchase, installation, and/or operation of third-party external IoT sensors. Now, instead of deploying multiple independent environmental sensors within an environment, customers may operate APs 304 that include a suite of onboard environmental sensors.

However, as noted above, operating environmental sensors as part of APs 304 may impact the operation of those APs 304. For example, the environmental sensors may consume resources of the AP such as power, computational capacity, bandwidth, etc., to collect its measurements. In some instances, operating the environmental sensors of an AP could violate resource limitations of the AP. For instance, the extra power consumed in operating an environmental sensor at an AP may cause the AP to exceed its power limits. The same may be true of the computational demands, bandwidth demands, etc. imposed by the environmental sensor with regard to their respective limitations at the AP. As an example, when operating, the environmental sensors may impact a power budget of the APs 304 and the APs 304 may exceed beyond their 802.3 at power requirement. Further, APs 304 may save power by periodically transitioning to a power saving state (e.g., when they are not being used by clients 306 to access to network 300). Power use limitations may be part of a power saving initiative, environmental initiative, etc. Of course, the persistent operation of environmental sensors of the APs 304 may prevent the APs 304 from transitioning into these power saving states, since the environmental sensors will continue to operate and consume power. Ultimately, integrating environmental sensors into these devices and others without considering the impact of the integration on the operation of the device may degrade and even destroy the operation of the device and/or the environmental sensor.

Moreover, the concern over the additional overhead imposed by these environmental sensors does not end at the AP. Indeed, the overhead of operating these sensors can also affect other aspects of the network and/or smart systems. For instance, environmental sensors can also impose additional power, bandwidth, computational, etc. burdens at a network controller and even at a cloud environment or other computing platform running a building management system. Again, operating the environmental sensors without regard to the overhead they impose at these systems can degrade or destroy their operation as well.

In some examples, environmental sensors of APs 304 may operate according to a sampling configuration. A sampling configuration may specify a sampling rate (e.g., how frequently an environmental sensor collects a sensor measurement), a sampling resolution (e.g., the level of analysis, fidelity, resolution, processing, etc. utilized for each sensor measurement), a measurement communication schedule (e.g., how frequently the data is reported), etc. for an environmental sensor. The power consumption, traffic overhead, processor utilization, etc. at APs 304 may be reduced by adjusting the sampling configuration to reduce the sampling rate, sampling resolution, frequency of measurement communication, etc. by the integrated environmental sensors.

Presently, sampling configurations specify sampling intervals, sampling resolutions, communication schedules, etc. as static and/or fixed values. For instance, an environmental sensor may collect sensor data at an AP and/or transfer it to a controller periodically (e.g., every 5 seconds) by default. This sampling configuration may be changed by customers via a controller. Although the sampling configuration may be adjusted, presently that configuration is the same for all APs associated with the controller once it is set. So, a controller may apply a same sampling configuration to all APs of a network and, accordingly, all may behave identically.

While on its face it may seem that the impact of the additional power, processor, bandwidth, etc. overhead imposed by the environmental sensors integrated into the APs 304 can be ameliorated by simply reducing the amount and resolution of measurements and/or communications by those environmental sensors, this strategy has consequences for the operation of the environmental sensors. For instance, when a value of the sampling interval for an environmental sensor is set too high and/or the value of its sampling resolution is set to too low, then the environmental sensor may fail to detect otherwise detectable events in dynamic environments. Alternatively, when a value of the sampling interval for an environmental sensor is adjusted lower and/or the value of its sampling resolution is adjusted higher to capture these events, then the environmental sensor may impose unnecessary overhead on APs 304, controllers, management platforms, etc. in environments that do not experience large variations. Moreover, in dynamic environments of the type that APs 304 are often located, even a sampling configuration that initially strikes a perfect balance between the overhead imposed by an environmental sensor and optimal environmental sensor sampling in a particular moment, that same sampling configuration may not be optimal for other sensor/AP combos in the environment at that moment and/or may not even be appropriate for the same sensor/AP in subsequent moments where conditions in the environment have changed. In dynamic environments, shifts in environmental conditions can be irregular and/or transitory so that a static and/or fixed sampling configuration may rarely reflect an optimal configuration.

Sampling Configurations for Environmental Sensors

The techniques herein introduce mechanisms for dynamically adjusting sampling configurations of environmental sensors of APs in a manner that reduces overhead imposed on the APs, controllers, environment management platforms, etc. by the environmental sensors while maintaining a level of effectiveness of the environmental sensors commensurate with conditions in an environment.

Illustratively, the techniques described herein may be performed by hardware, software, and/or firmware, such as in accordance with sampling configuration process 248, which may include computer executable instructions executed by the processor 220 (or independent processor of interfaces 210) to perform functions relating to the techniques described herein.

Specifically, according to various embodiments, a device may obtain sensor measurements from an environmental sensor of an access point. The device may obtain traffic telemetry data regarding network traffic handled by the access point. The device may generate, based on the sensor measurements and the traffic telemetry data, a sampling configuration of the environmental sensor of the access point. The device may cause the access point to collect additional sensor measurements from its environmental sensor according to the sampling configuration.

Operationally, and according to various embodiments, a device (e.g., device 200) may assess any number of different inputs from the environment, to generate a sampling configuration that calibrates sampling by environmental sensors of an AP to environmental conditions, network conditions, device conditions, etc. This can also be done dynamically, so as to adapt the sampling by sensors onboard an AP to the changing conditions in the environment As a result, APs with integrated environmental sensors may avoid exceeding power budgets and/or other operational limitations and may achieve increased efficiencies while still providing a most useful level of environmental sensor activity. In addition, by intelligently grouping APs and monitoring the performance of their sensors, an automated mechanism for anomaly detection and correction can also be implemented.

Figure 4:
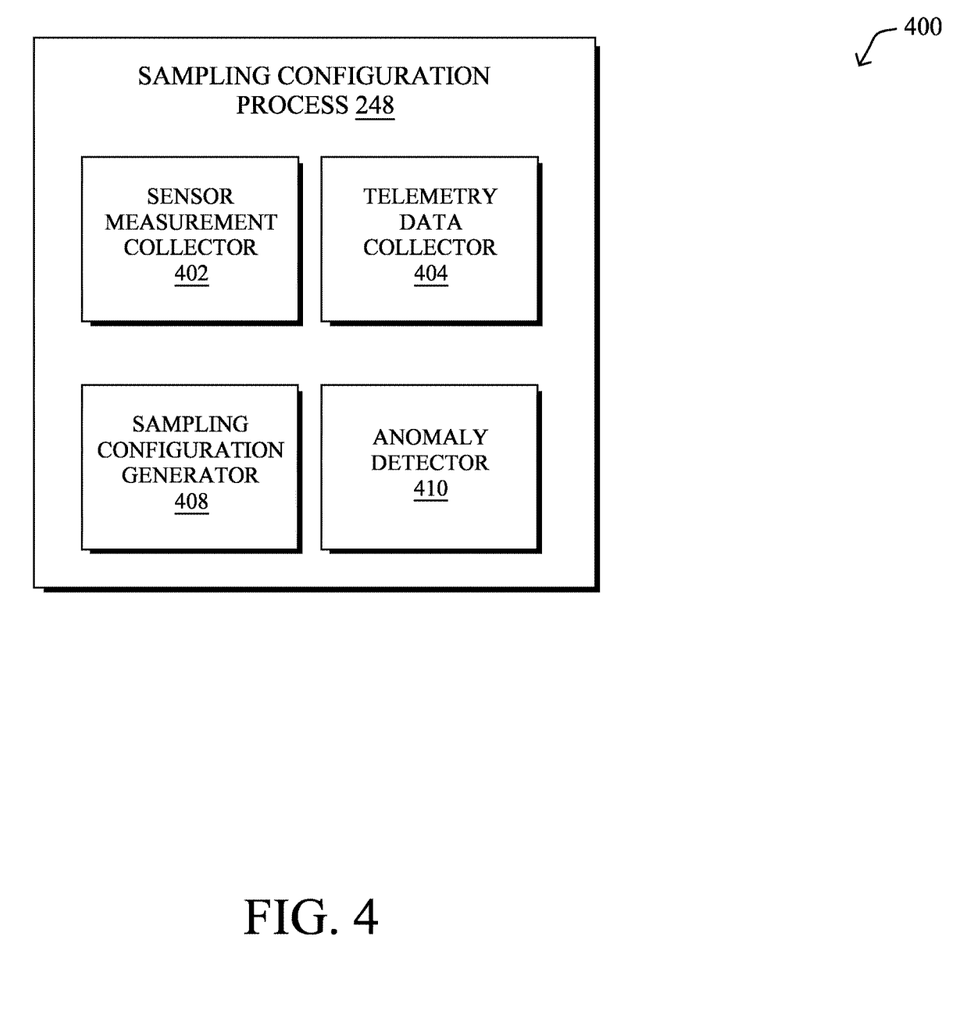
FIG. 4 illustrates an example architecture for generating sampling configurations of environmental sensors.

FIG. 4 illustrates an example architecture 400 for generating sampling configurations for environmental sensors, according to various embodiments. For example, architecture 400 may be utilized to perform sampling configuration process 248.

Sampling configuration process 248 may dynamically sample inputs from APs with environmental sensors. The sampled inputs may be used to calculate sampling configurations that minimize the impact of the environmental sensors on power budgets and/or other resource constraints while at the same time not degrading effectiveness of these environmental sensors and adjusting their activity to reflect conditions in the environment. For example, sampling configuration process 248 may sample measurements of environmental sensors as inputs.

Sampling configuration process 248 may include a sensor measurement collector 402. Sensor measurement collector 402 may obtain sensor measurements from an environmental sensor of an AP. These sensor measurements may be collected from environmental sensors of a particular AP, a neighboring AP, another AP in a same set, a group of APs, etc. In addition, the sensor measurements may be collected from external environmental sensors that are not integrated with an AP (e.g., standalone sensors, sensors embedded in client devices such as virtual conferencing devices, security cameras, etc.). The sensor measurements may include measurements of a variety of conditions in the environment.

Sampling configuration process 248 may sample telemetry data as an input. Sampling configuration process 248 may include telemetry data collector 404. Telemetry data collector 404 may collect telemetry data from a particular AP, a neighboring AP, another AP in a same set, a group of APs, client devices, network traffic monitors, network switches, etc. The telemetry data may include indications of the type of data, type of client activity, type of client devices, etc. present on the network and/or across APs.

In various embodiments, sampling configuration process 248 may include sampling configuration generator 408. Sampling configuration generator 408 may generate sampling configurations for environmental sensors based on the telemetry data collected by telemetry data collector 404 and/or the sensor measurements collected by sensor measurement collector 402. For instance, sampling configuration generator 408 may generate sampling configuration profiles that define a sampling rate, sampling resolution, measurement communication schedule, etc. for an environmental sensor. The sampling configuration may be applied to an environmental sensor of a particular AP, a neighboring AP, another AP in a same set, a group of APs, etc. The sampling configuration profile may then be applied to the operation of the target environmental sensor or sensors. As such, an access point or access points may collect subsequent sensor measurements from its environmental sensor according to the applied sampling configuration.

Sampling configuration process 248 may also include anomaly detector 410. In some instances, a sampling rate, sampling resolution, measurement communication schedule, etc. specified in a sampling configuration may not achieve the targeted overhead/sensor activity balance when it is generated based on anomalous inputs. That is, sampling configuration process 248 may only be as good as the inputs it relies upon (e.g., telemetry data collected by telemetry data collector 404, sensor measurements collected by sensor measurement collector 402, etc.). Therefore, sampling configuration process 248 may be sensitive to anomalous behavior and/or errors at an AP and/or an environmental sensor.

For example, an AP housing an environmental sensor may be located too close to an HVAC vent or direct sunlight. This may cause the measurements by its integrated environmental sensors to inaccurately measure prevailing conditions in an environment such as a building. Likewise, an environmental sensor may be damaged (e.g., by excessive heat within an AP), lose its calibration, or otherwise begin to collect erroneous sensor measurements that do not accurately reflect conditions in an environment.

Relying on erroneous and/or anomalous sensor measurements to adjust sampling configurations may undermine the ability of sampling configuration process 248 to identify an optimal sampling configuration. To address this vulnerability, anomaly detector 410 may identify sensor measurements that are anomalous and/or erroneous. This identification can be used in a variety of ways to bring attention to and/or correct for the anomaly and/or error. As discussed in more detail with respect to FIG. 5, anomaly detector 410 may detect and/or correct for anomalies by generating dynamic building profiles from environmental sensor characterizations and intelligent clustering of spatially related and/or measurement correlated sensor/AP combos. Anomaly detector 410 may construct and train models and/or implement logic rules that can be used to compare to the behavior of sensors and identify anomalous behaviors using these inputs and others. Anomaly detector 410 may also apply corrective measures to anomalous sensor measurements. For example, anomaly detector 410 may corrective measures ranging from reporting anomalous behavior to invalidating data sets to applying corrective offsets to measurement, etc.

Overall, sampling configuration process 248 may utilize some or all of these components in a variety of ways to arrive at an optimized sampling configuration. For instance, sampling configuration process 248 may adjust the sampling configuration in a certain area of a building where a sensor/AP combo or cluster of sensor/APs combos are located, based on account characteristics of clients associated to an access point or to a cluster of access points.

For instance, telemetry data collector 404 may collect telemetry data from APs, switches, etc. Sampling configuration generator 408 may use this data to adjust a sampling rate, sampling resolution, measurement communication schedule, etc. for an environmental sensor of that AP or other neighboring APs. The telemetry data may be indicative of a type (e.g., device type, etc.) and/or identity of a client associated to an AP, switch, etc. In addition, the telemetry data may be indicative of a type of client activity (e.g., an application or process being run by the client on the network).

In various embodiments, sampling configuration process 248 identify the presence and/or activity of people in certain areas of the environment corresponding to the locations of the device from which the telemetry data was originated and/or retrieved. In this manner, sampling configuration process 248 may throttle the environmental sensor activity in these areas to match the amount of human activity in those areas. For example, sampling configuration process 248 may generate sampling configurations that cause more data to be collected in areas of the environment where more people are located.

For example, an AP may provide wireless network access to client devices within a specific area (e.g., its signal coverage area) of an environment. Therefore, the association of a client to an AP may reveal the presence of the client device (and a likely presence of a person operating the client) not only in the environment generally, but also within a specific area of the environment corresponding to the APs signal coverage area. For example, multiple APs may be spread throughout a building and each of the APs may provide network access for a different area (e.g., floor, room, group of rooms, hallway, segment of a floor, etc.) of the building. Therefore, when a client device is associated to an AP providing network access in a particular area of a building, sampling configuration process 248 may determine that the client device and/or the person operating that client device is located in that particular area of the building. Some APs may determine which portion of their signal coverage area a client is located in. That data can also be used to refine the sampling configurations.

For instance, telemetry data collector 404 may collect telemetry data from an AP. The telemetry data may indicate the presence of wireless clients such as laptops and mobile phones in an area of the building serviced by that AP. Therefore, sampling configuration process 248 may determine that a corresponding amount of people are located in that area. For example, when ten mobile devices are associated to an AP, sampling configuration process 248 may infer the presence of ten people in the coverage area of the AP.

A building manager may have more interest in a certain type of data (e.g., CO2 data) from an area when there are more densely populated by people. In such examples, sampling configuration generator 408 may detect that a quantity of laptops or phones associated to an AP or group of APs exceeds a threshold quantity. For example, the sampling configuration generator 408 may determine that there are more than ten people in a conference room. Then sampling configuration generator 408 may adjust a sampling configuration of environmental sensors of the AP or group of APs in that area so that their sampling frequency and/or sampling resolution is increased at least with respect to the certain type of data (e.g., CO2 data).

The sampling configuration may be applied to an AP or group of APs in that area of the building. The sampling configuration may cause the AP or group of APs in that area of the building to transition out of a low power mode, collect high resolution data, and send the appropriate data at higher sampling rate than when client activity less than the threshold quantity is detected in that area. For instance, the sampling configuration may bring TVOC, CO2, and PM2.5 sensors out of power saving modes and into high resolution modes when over ten people associate to an AP servicing a conference room. Under this arrangement, APs may follow a power consumption reduction protocol. The protocol may place the AP in low power modes to conserve power when possible. Using the outlined mechanism, the sampling configuration may only minimally interrupt and/or only interrupt the power consumption reduction protocol when there is an increased likelihood of the onboard environmental sensors yielding important and/or useful data to an environment management platform.

Likewise, telemetry data collector 404 may collect wired user activity data obtained from switches. The wired user activity data may indicate the presence of wired devices (e.g., laptops on a docking station, etc.) and/or their operators on the network. The sampling configurations at environmental sensors of an AP or group of APs may be adjusted, based on the wired user activity data. For example, sampling configuration process 248 may generate sampling configurations that increase sample collection rate, sampling resolution, measurement communication, etc. by the environmental sensor in response to an increased presence of wired devices and/or their operators on the network.

As previously mentioned, sampling configuration process 248 may generate sampling configurations for environmental sensors based on a type of traffic or client activity on the network. For example, sampling configuration process 248 may use network intelligence and deep packet inspection applied to telemetry data collected by telemetry data collector 404 to identify the type of traffic on a network. The type of traffic on the network may indicate a type of client activity to sampling configuration process 248. For example, sampling configuration process 248 may identify some traffic as being associated with a virtual conferencing service (e.g., Webex, etc.) and/or a virtual conferencing device (e.g., a Webex device, a videoconferencing camera, a videoconference microphone, a videoconferencing display, etc.). Sampling configuration process 248 may determine that a user is engaging in a virtual conference based on detecting this type of network traffic.

In response to detecting this type of traffic, sampling configuration generator 408 may generate a sampling configuration. The sampling configuration may increase collection rate, resolution, communication, etc. of sensor measurements at environmental sensors integrated in APs in the immediate vicinity (e.g., within a threshold distance, within a same room as, within a same area as, on a same floor as, etc.) of a device running the virtual conferencing service and/or the virtual conferencing device.

In addition, sampling configuration generator 408 may use radio frequency (RF) density of APs, wireless neighbor relationships, and/or air pressure differences to generate sampling configurations for environmental sensors. For example, a neighbor discovery packet may be sent over a WiFi connection. Telemetry data collector 404 may monitor the receipt and/or transmission of the neighbor discover packet. As such, telemetry data collector 404 may use the neighbor discovery packet to detect proximity and/or spatial relationships among APs located in the environment. Additionally, telemetry data collector 404 may use differences in the measurements (e.g., collected by sensor measurement collector 402) of air pressure sensors among sensor/AP combos in the environment to measure their height differences. The telemetry data collector 404 may use the combination of wireless proximity and air pressure difference to establish proximity of APs within an area of an environment. For example, telemetry data collector 404 may use these measurements to establish groups of neighboring APs within a portion of an environment. Referring to FIG. 3, telemetry data collector 404 may use wireless proximity and air pressure difference data for APs 304 to establish a first group of neighboring APs (e.g., AP 304a and AP 304c) and a second group of neighboring APs (e.g., AP 304b and AP 304d) on a floor of a building.

Sampling configuration process 248 may use this proximity mapping to group neighboring APs and/or their environmental sensors in a way that allows for efficiencies in environmental sensor operations such as area specific and/or event specific sensor responses. In addition, sampling configuration process 248 may use sensor behavior patterns to further refine membership within groups of neighboring APs. For example, each AP may collect baseline environmental sensor measurements over the span of a few days. Sampling configuration process 248 may use these measurements to establish a daily pattern of measurements and/or their variation. The daily pattern may be similar between APs in close proximity to one another. For instance, environmental sensors of a set of neighboring APs proximate to one another in a portion of a large open area of a building may be expected to have similar sensor measurements. Conversely, the daily pattern may be very different if the APs are, while still being proximate with respect to the floorplan, located in different rooms of a building (e.g., in a conference room vs. in a neighboring café).

Once it is established that APs with a spatial relationship (e.g., within a close proximity) also have similar environmental sensor measurement patterns, then sampling configuration process 248 may group those APs into a set of APs. Therefore, sensor measurements across that set of sensor/AP combos may, at times, be duplicative of one another. As such, sampling configuration generator 408 may generate a sampling configuration to configure a portion of the APs in the set to report less frequently since less data is required and a correlation between the measurements has already been established. Further, sampling configuration process 248 may apply a scheduling mechanism that facilitates compression of the environmental sensor data in certain RF neighborhood areas to further reduce the overhead of the data fusion at the controller and/or an environment management platform.

Sampling configuration generator 408 may use the grouping of the APs into these sets that share spatial relationships and correlated environmental sensor measurements to increase sensor activity at the APs. For example, environmental sensors of one or more of the APs in the set may detect a major event (e.g., an environmental sensor measurement, which may be obtained by sensor measurement collector 402, that exceeds a threshold measurement for that type). In response, sampling configuration generator 408 may generate a sampling configuration that triggers other APs (other than the AP that detected the event) in the set to collect more sensor measurements, sensor measurements at a higher resolution, communicate sensor measurement more frequently, etc.

This sampling configuration may be applied to all other sensor/AP combos in the set or only to a portion of the other sensor/AP combos in the set. For example, the new sampling configuration may be applied only to those other sensor/AP combos in the set that are most proximate (e.g., immediately neighboring) the sensor/AP combo that detected the event and if those sensor/AP combos also detect the major event, then the sampling configuration may continue to be cascaded out to their most proximate sensor/AP combos in the set. In another example, where there is directionality associated with the sensor measurement of the major event, the new sampling configuration may be applied only to those other sensor/AP combos in the set that are located in the direction and/or immediate proximity of the direction or location where the major event was detected.

Moreover, the new sampling configuration may adjust the existing sampling configuration of specific sensors. That is, while in some embodiments the new sampling configuration may increase sensor activity of all environmental sensors on other APs in the set, some embodiments may be more selective. For example, sensor/AP combos may have a diverse suite of integrated environmental sensors onboard. However, a major event detected at the AP may only implicate a portion of those environmental sensors (e.g., those environmental sensors whose measurements are helpful in further classifying the event). As a result, the new sampling configuration applied to the other sensor/AP combos in the set may only adjust the sampling configuration of those implicated environmental sensors.

For example, a total volatile organic compounds (TVOC) environmental sensor of a first AP of the set may detect a major event such as a high amount of a TVOC. Sampling configuration generator 408 may generate a sampling configuration applicable to a portion of the other sensor/AP combos in the set to increase the sampling rate, sampling resolutions, etc. of their TVOC sensors, particulate matter two- and one-half microns (PM2.5) sensors, temperature sensors, and/or a humidity sensor for a certain duration (e.g., 30 mins, etc.). Those adjusted environmental sensors may also detect the environmental change and/or provide supporting environmental sensor measurements to classify the event. Sampling configuration process 248 report these supporting measurements, the original measurement, and/or the classification of the major event resulting from the collection of measurements and/or trigger a notification by the controller and/or a smart building management platform executing in a cloud environment.

In various embodiments, sensor measurement collector 402 may collect inputs from external environmental sensors and adjust the sampling configuration of environmental sensors that are integrated in the APs based on those inputs. External environmental sensors may be environmental sensors that are not integrated into an AP. The external sensors may be environmental sensors (e.g., IOT sensors, standalone sensors, sensor integrated into other devices, etc.) that, although not integrated into an AP, may be communicatively coupled to an AP such as via a wired or wireless connection. For example, an external sensor may be located in a physical proximity of an AP (e.g., within a threshold distance) such that a neighbor relationship between the external sensor and an AP may be established using a limited proximity communication protocol such as Bluetooth low energy (BLE) protocol.

Once neighbor relationships are established between external sensors and APs, sampling configuration process 248 may utilize the sensor measurements from the external sensors to influence the operation of the environmental sensors integrated in their neighboring APs. For example, an external sensor such as a camera, motion detector, microphone, distance sensor, etc. may collect sensor measurements that are indicative of a quantity of people in an area of an environment. The sampling configuration generator 408 may generate a sampling configuration to increase the sampling rate, sampling resolutions, measurement communications, etc. of environmental sensors (e.g., those associated with collecting air quality data) that are integrated in an AP or APs that have a neighbor relationship to the external sensors. That is, sampling configuration generator 408 may utilize data from a neighboring external sensor data to generate sampling configurations that increase or decrease the sensor activity in sensor/AP combos that are near the external sensor or near APs that the external sensor is associated to.

For example, external sensors may detect that there are over a threshold amount of people (e.g., 10 people) in a conference room. In response, sampling configuration generator 408 may generate and/or apply a sampling configuration that increases the sampling rate, sampling resolutions, measurement communications, etc. by an environmental sensor integrated in an AP in that conference room that is capable of measuring CO2 levels. In some examples, if the CO2 levels detected by the integrated environmental sensors exceed a threshold level, this may trigger an event indicating that ventilation is not sufficient. This may mean that the conference room may not be safe according to public health protocols, disease transmission protocols, etc. Conversely, if the external sensors indicate that there is nobody in the conference room, a single person is in the conference room, the number of people in the conference room has dipped below the threshold amount, etc., then sampling configuration generator 408 may generate or apply a sampling configuration that discontinues sampling and/or decreases the sampling rate, sampling resolutions, measurement communications, etc. of the CO2 sensors integrated in the conference room APs.

While various specific examples have been described above, the disclosed mechanism is not so limited. For example, sampling configuration process 248 is not intended to be limited to any particular AP type, sensor type, sensor measurement type, telemetry data type, sampling configuration type, mechanism of determining a sampling configuration, etc. Sampling configuration process 248 may use various combinations of sensor measurements, telemetry data, AP groupings, sampling configuration determinations, mechanisms of determining a sampling configuration, etc. In addition, sampling configuration process 248 may use any sensor measurements, telemetry data, or other indications of conditions or activity in the environment to optimize environmental sensor activity at an AP while reducing the overhead imposed on the AP, controller, cloud, etc.

For example, sampling configuration process 248 may use any sensor measurements and/or telemetry data that provide device and/or traffic classifications from network devices and/or which provide context for the importance or relevance of particular sensor measurements. Further, sampling configuration process 248 may use any mechanism of establishing a wireless neighbor relationship and/or relative positioning of sensors in an environment and/or any historical sensor data that can correlate sensor activity among neighboring sensors to minimize redundant data and/or increase sensor activity in an area of interest. Furthermore, sampling configuration process 248 may use any external sensor data to trigger a change of a power state and/or sampling configuration of integrated sensors when appropriate. The same is true with respect to the anomaly detection and/or correction functionalities of sampling configuration process 248.

Figure 5:
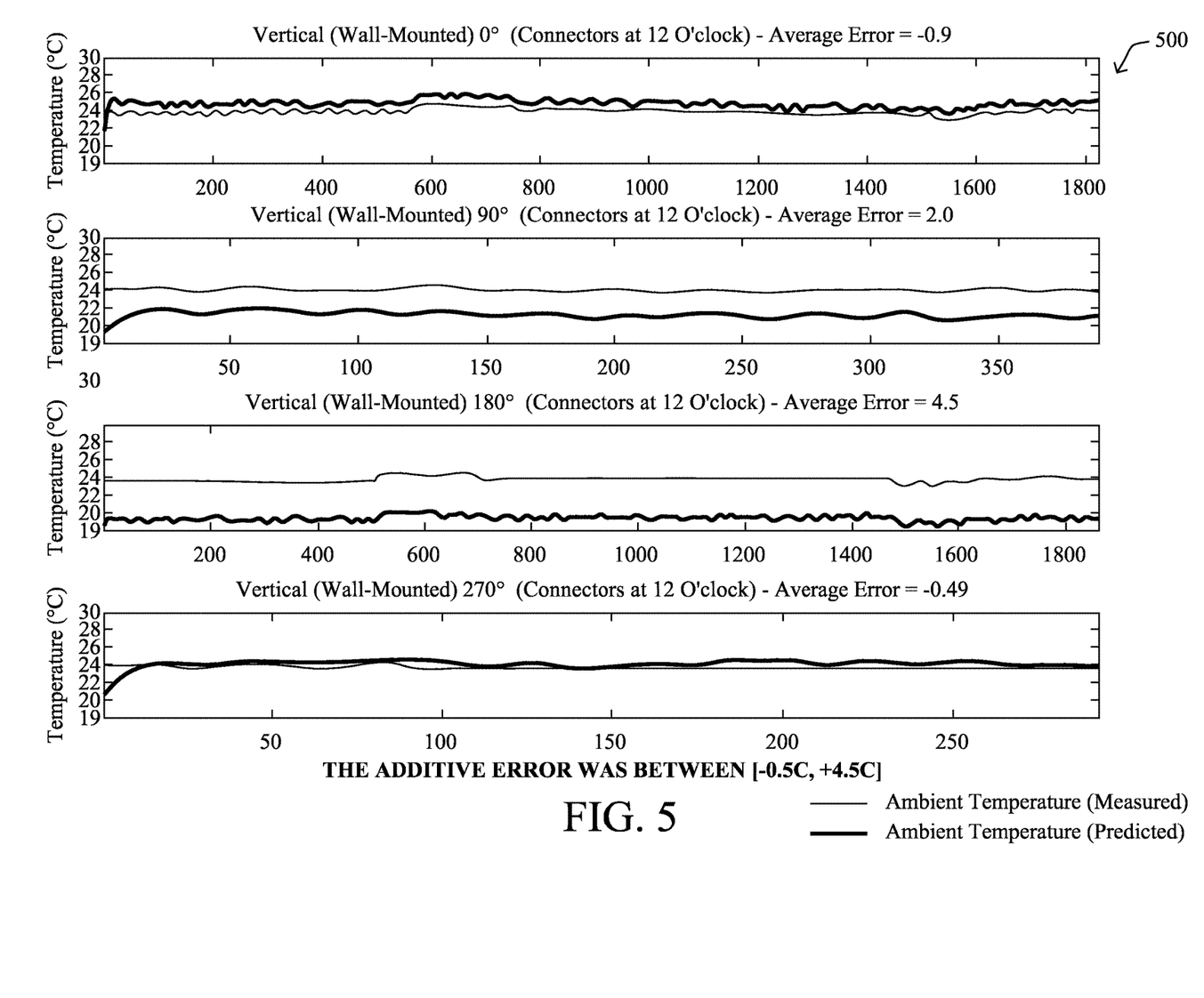
FIG. 5 illustrates an example set of measurements of error at environmental sensors integrated in an AP.

FIG. 5 illustrates an example set of measurements 500 of the error in sensor measurements of environmental sensors integrated into APs, according to various embodiments. As noted above, erroneous and/or anomalous readings from an environmental sensor may be detrimental to generating a sampling configuration that balances the resource demands of an AP with the resource demands of its integrated sensor in the context of conditions within an environment where they are located. In some examples, mounting positions of an AP with integrated sensors can contribute to erroneous and/or anomalous sensor measurements. An AP may be mounted with network access coverage in mind and not environmental sensor performance. For example, an AP may be mounted to provide coverage to a particular area of the environment without realizing that it is mounted to close to an HVAC cent blowing air vertically in office environments and skewing sensor measurements.

Set of measurements 500 illustrate how small variations and/or errors in a mounting position of a sensor/AP combo can result in large variations or errors in sensor measurements collected its environmental sensors. For example, across a zero-degree, ninety-degree, one hundred eighty-degree, and two hundred seventy-degree variations of mounting orientation of an AP, up to four-and-a-half degrees of error in the sensor measurements of its integrated temperature sensors may be observed.

In addition to mounting errors, occasional patterns of sensor measurements that are outside of operating specifications and/or normal behavior for the sensor may be observed. For example, occasional patterns of sensor measurements not observed in laboratory and/or environment testing may be observed. In some instances, these patterns may be caused by an occasional power supply issue or some other hardware, software, firmware, etc. malfunction.

Regardless of the source of an anomalous or erroneous sensor measurement, it may adversely impact achieving a sampling configuration that accurately reflects environmental conditions and minimizes overhead. As such, the sampling configuration process (e.g., sampling configuration process 248) may incorporate anomaly detection (e.g., via anomaly detector 410).

Anomaly detection mechanisms may utilize various strategies including environmental sensor characterization. Environmental sensor characterization may include characterizing a sensor measurement profile for an environmental sensor based on historical or similar environmental sensor measurements. For example, a characterization of an environmental sensor may be based on its sensor measurements as collected in a controlled laboratory setting (e.g., a control chamber) where different parameters are controlled. In various embodiments, this characterization may further be based on the performance of other environmental sensors from a same or a different batch operating in the same controlled setting. Additionally, the environmental sensor characterization may be based on the historical performance of the environmental sensor or similar environmental sensors in the same or similar conditions to the deployment environment (e.g., within a same or similar office building, etc.). In addition, the environmental sensor characterization may be based on the historical performance of the environmental sensor or similar environmental sensors while in the environment or area of the environment it is operating within. For example, the characterization of the environmental sensor may be based on its historical measurements over the last day, week, month, year, etc. in its operating environment. Regardless of the source of the data, the environmental sensor characterization may indicate a pattern of sensor reading expected from the environmental sensor when it is operating normally (e.g., non-erroneously, non-anomalously, etc.).

Once the APs and their environmental sensors are deployed, the sampling configuration process may collect the environmental sensor characterization from each of the APs and use location data to create a joint building model. The joint building model may comprise several groups of APs and/or their integrated environmental sensors. As described above, sampling configuration process 248 may utilize wireless discovery packets, radio frequency (RF) density of APs, wireless neighbor relationships, information collected from switches, air pressure difference, etc. to inform grouping APs and/or their integrated environmental sensors into a set of neighboring devices.

In order to detect and/or correct anomalies and/or errors in the sensor measurements collected at the AP's, a controller and/or building management platform may cluster APs into clusters with similar sensor measurements. The spatial relationship of the APs to one another, including information about the minimum and/or maximum values for the center and radius of a cluster, may be utilized by a sampling configuration process 248 to inform the clustering of the APs. The sampling configuration process 248 may group clusters of APs into a same grouping as neighboring AP groups or it may further refine the set of those APs that also share correlated sensor measurements and/or are located in a same particular area (e.g., room, hallway, wing, etc.) of the environment.

Sampling configuration process 248 may apply anomaly detection to all or part of a cluster of APs. For example, sampling configuration process 248 may calculate a Z-score metric for the entire cluster. Therefore, sampling configuration process 248 may device whether to discard the data of the cluster or adjust it. For example, sampling configuration process 248 may determine that the data of the cluster is invalid, valid, or partially valid. Sampling configuration process 248 may apply an adjustment to partially valid data.

In various embodiments, sampling configuration process 248 may identify an anomaly based on an RF neighbor list. For example, a sampling configuration process 248 may use the spatio-temporal information of sensors in APs that are in a vicinity of each other and demonstrate higher correlation to further remove outlier measurements. Sampling configuration process 248 may incorporate some RF metrics such as received signal strength indicator (RSSI) into an anomaly detection algorithm as a parameter that indicates the relative distance and/or other spatial relationship between sensor/AP combos. The higher the RSSI between APs may mean a higher expected correlation between the environmental sensor measurements collected at the two APs.

In addition, when data from an environmental sensor of an AP is not completely discarded, sampling configuration process 248 may adjust it based on the environmental sensor measurements of the environmental sensors integrated in neighboring APs. Sampling configuration process 248 may estimate an offset to a sensor measurement using the statistical data from RF neighbors. Additionally, sampling configuration process 248 may apply an offset to measurements based on orientation of the AP when that data is available.

Therefore, the process of anomaly detection and/or correction may start with the usage of an automated location discovery that utilizes wireless proximity of APs and/or relative air pressure delta between environmental sensors at APs to establish location proximity. Then, sampling configuration process 248 may logically cluster APs with similar patterns of sensor measurements together to establish groups and build a model of sensor behavior and/or proximity in the environment. This model may be utilized to create rules. If a sensor's behavior fails a rule, then it may be potentially anomalous or erroneous and sampling configuration process 248 may check the sensor's behavior against the environmental sensor characterization for that device.

If the sensor behavior does not match and/or fit within the environmental sensor characterization, then the sampling configuration process 248 may determine that the sensor's behavior is anomalous and/or erroneous and deem the environmental sensor to have failed. As such, sampling configuration process 248 may report the device failure to IT personnel or the like. Conversely, if the potentially anomalous or erroneous sensor behavior is determined to be within the environmental sensor characterization, then sampling configuration process 248 may make an adjustment to the sensor measurements before reporting the data to a consumer. In some examples, sampling configuration process 248 may use a model such as a probabilistic graphical model to represent dynamic processes to model changes in environmental sensors and/or environmental conditions and detect outliers.

Sampling configuration process 248 may also use load monitoring at the environmental sensors integrated in the APs to identify likely anomalous and/or erroneous sensor measurements and/or adjust how those sensor measurements are handled. For example, if a high load of an environmental component is sensed at an environmental sensor of an AP for a first time, the sensor measurements on that AP may not be valid for reporting within a period of time following the high load detection (e.g., the first 30 minutes). As such, sampling configuration process 248 may invalidate the sensor measurements collected within that period of time following the high-load detection.

In addition, monitored measurements from environmental sensors integrated in neighboring APs may be utilized by sampling configuration process 248 to identify likely anomalous and/or erroneous sensor measurements and/or adjust how those sensor measurements are handled. For example, if neighboring APs (e.g., APs in a same cluster, APs within a threshold distance, APs in a same area of an environment, etc.) do not show changes in their measurements that correlate to the sensor measurements at an AP detecting an event, then sampling configuration process 248 may assume that the sensor measurements at the AP detecting the event are anomalous and/or erroneous. If the AP detecting the event recently experienced a high load, then sampling configuration process 248 may determine that the sensor measurements are a result of the load change rather than an accurate sensor measurement. Additionally, since the sensor measurements of the neighboring APs may be determined to be the accurate measurements, then sampling configuration process 248 may determine an offset from those measurements. For example, once the environmental sensor of the AP detecting the event has experienced that load and the delta between its sensor measurements and the sensor measurements of the environmental sensors integrated in neighboring APs is known, sampling configuration process 248 may apply that delta to the future sensor measurements of the AP having detected the event relative to the sensor measurements at the neighboring APs at the time.

In various embodiments, sampling configuration process 248 may use a wireless traffic statistic not only to compensate the offset but also to give a confidence interval for a sensor measurement of an environmental sensor. Wireless statistics may include transmit duty cycles, receive duty cycles, power amplifier bias, and/or temperature measurements from temperature sensors inside of wireless ASICs to detect extreme heat inside of an AP. For example, when extreme heat is detected in a sensor/AP combo for extended durations, the sampling configuration process 248 may determine that potential damage and/or saturation of the environmental sensors integrated into the AP has occurred. This may reduce a confidence interval associate with some of the sensor measurement of the environmental sensors integrated in that AP. Sampling configuration process 248 may collect these and other aggregate statistic on an AP and/or a controller and may use them to assign weights to sensor measurements before aggregated metrics are computed for a cluster of APs.

In an example, an environmental sensor of an AP may detect an elevated quantity of TVOCs. The quantity may be outside a range of measurements of the cluster of APs to which the AP belongs. Therefore, sampling configuration process 248 may instruct a micro electro-mechanical system (MEMS) sensor to measure more data points to verify the sensor measurements on APs of that cluster before reporting that data. For example, a TVOC sensor may have different power modes, sampling rates, and/or number of samples before a first report which may be adjusted by sampling configuration process 248 based on historical data from the AP and other APs in the same cluster.

In another example, an environmental sensor of a particular sensor/AP combo may detect elevated airflow. Therefore, the sampling configuration process 248 may invalidate temperature and humidity data, and use interpolation between the cluster of sensor/AP combos within a close proximity of the particular sensor/AP combo in order to estimate the temperature and humidity at the particular sensor/AP until the air flow drops and temperature and humidity can be accurately measured again.

To summarize, the sampling configuration process 248 may perform anomaly detection utilizing observations of network activity and/or proximity of environmental sensors and apply modeling techniques to detect and/or correct anomalous and/or erroneous sensor measurements. For example, the sampling configuration process 248 may perform anomaly detection by creating a dynamic profile of the environment which may include environmental sensor characterizations and zones corresponding to clusters of sensor/AP combos that are formed based on location proximity. The sensor measurements and/or measurement variance over time may be grouped based on these clusters. Additionally, sampling configuration process 248 may apply automatic correction to sensor measurements based on network conditions and external ecosystem impacts. Failures of environmental sensors may be rapidly detected and reported by sampling configuration process 248. When insufficient model training has occurred to compensate for anomalous sets of sensor measurements, sampling configuration process 248 may invalidate those sensor measurements.

Figure 6:
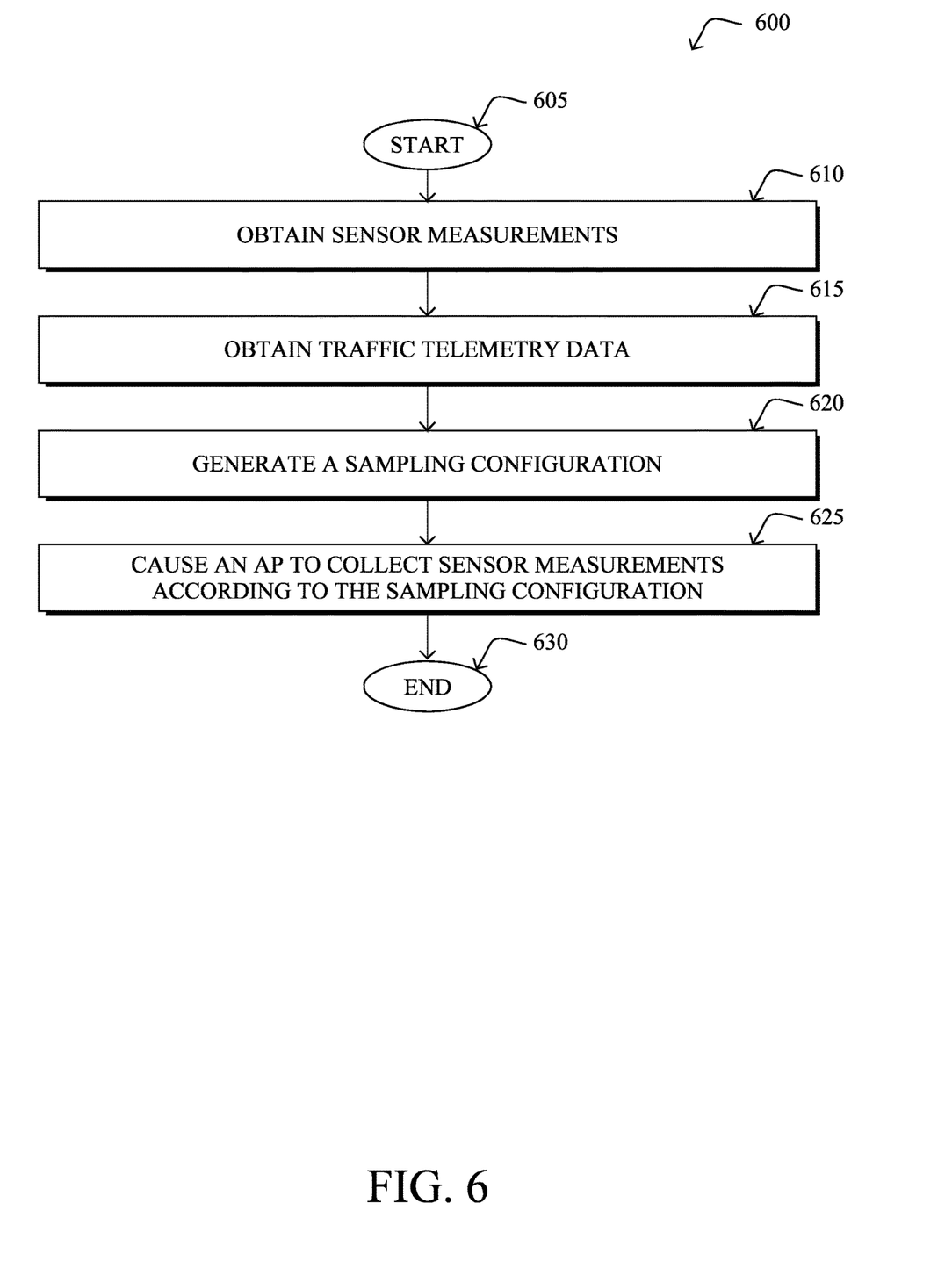
FIG. 6 illustrates an example simplified procedure for generating sampling configurations for environmental sensors.

FIG. 6, illustrates an example simplified procedure (e.g., a method) for generating sampling configurations for environmental sensors, in accordance with one or more embodiments described herein. For example, a non-generic, specifically configured device (e.g., device 200), may perform procedure 600 by executing stored instructions (e.g., sampling configuration process 248). The procedure 600 may start at step 605, and continues to step 610, where, as described in greater detail above, a device may obtain sensor measurements from an environmental sensor of an AP. The access point may comprise the environmental sensor. The environmental sensor may be a temperature sensor, a relative humidity sensor, or a gas sensor.

At step 615, as detailed above, the device may obtain traffic telemetry data regarding network traffic handled by the access point. The traffic telemetry data may include an indication of a type of traffic handled by the access point. The type of traffic may be indicative of a type of user activity. The traffic telemetry data may be indicative of a number of clients associated to the access point.

At step 620, as detailed above, the device may generate based on the sensor measurements and the traffic telemetry data, a sampling configuration of the environmental sensor of the access point. Generating the sampling configuration may include determining an adjustment to a sampling rate or a sampling resolution of the environmental sensor At step 625, where, as detailed above, the device may cause the access point to collect additional sensor measurements from its environmental sensor according to the sampling configuration. The sampling configuration may cause the access point to leave a power saving mode when its environmental sensor collects the additional sensor measurements. In various embodiments, the sampling configuration may cause the access point to reduce a sampling rate of its environmental sensor and may be based further on a correlation between the sensor measurements obtained from the access point and sensor measurements from one or more access points within a defined proximity of the access point. In some embodiments, the sampling configuration may cause the access point to increase a sampling rate of its environmental sensor and be based further on an event detected by another access point within a defined proximity of the access point. In addition, the device may determine that the sensor measurements are anomalous. In some examples, the device may provide an indication that the sensor measurements are anomalous to a user interface. In some examples, the device may adjust the sensor measurements determined to have been anomalous using an offset that makes them non-anomalous. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce mechanisms for dynamically adjusting sampling configurations of environmental sensors of APs in a manner that reduces overhead imposed on the APs by the environmental sensors while maintaining a level of effectiveness of the environmental sensors commensurate with conditions in an environment. The techniques incorporate the context of telemetry data, environmental sensor data, and neighboring device data to generate sampling configurations that achieve this dynamic balancing act. In addition, the techniques provide for mechanisms of anomaly detection and correction that leverage environmental sensor characterizations and proximity and sensor measurement correlation among cluster of APs and their environmental sensors to identify anomalous measurements and corrective actions such as reporting, invalidating, adjusting, etc. the anomalies.

While there have been shown and described illustrative embodiments that provide generating sampling configurations for environmental sensors, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well. In addition, while certain examples of sensors, sensor measurements, telemetry data, sampling configurations, anomaly detection, etc. are discussed herein, the techniques herein may be used in conjunction with any variations thereof.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a device, sensor measurements from an environmental sensor of an access point;
   obtaining, by the device, traffic telemetry data regarding network traffic handled by the access point that is indicative of a type or an activity of clients associated to the access point, wherein the type comprises a device type of a given client and the activity comprises an application or process executing on the given client;
   generating, by the device and based on the sensor measurements and the traffic telemetry data, a sampling configuration of the environmental sensor of the access point, wherein the sampling configuration controls transitions among power states of the access point; and
   causing, by the device, the access point to collect additional sensor measurements from its environmental sensor according to the sampling configuration.

2. The method as in claim 1, wherein generating the sampling configuration includes determining an adjustment to a sampling rate or a sampling resolution of the environmental sensor.

3. The method as in claim 1, wherein the traffic telemetry data includes an indication of a type of traffic handled by the access point, wherein the type of traffic is indicative of a type of user activity.

4. The method as in claim 1, wherein the access point comprises the environmental sensor and the environmental sensor is a temperature sensor, a relative humidity sensor, or a gas sensor.

5. The method as in claim 1, wherein the sampling configuration causes the access point to leave a power saving mode when its environmental sensor collects the additional sensor measurements.

6. The method as in claim 1, wherein the traffic telemetry data is indicative of a number of clients associated to the access point.

7. The method as in claim 1, wherein the sampling configuration causes the access point to reduce a sampling rate of its environmental sensor and is based further on a correlation between the sensor measurements obtained from the access point and sensor measurements from one or more access points within a defined proximity of the access point.

8. The method as in claim 1, wherein the sampling configuration causes the access point to increase a sampling rate of its environmental sensor and is based further on an event detected by another access point within a defined proximity of the access point.

9. The method as in claim 1, further comprising:
determining that the sensor measurements are anomalous and providing an indication that the sensor measurements are anomalous to a user interface.

10. The method as in claim 1, wherein performing anomaly detection further comprises:
determining that the sensor measurements are anomalous and adjusting the sensor measurements using an offset that makes them non-anomalous.

11. An apparatus, comprising:
one or more network interfaces;
a processor coupled to the one or more network interfaces and configured to execute one or more processes; and
a memory configured to store a process that is executable by the processor, the process when executed configured to:
obtain sensor measurements from an environmental sensor of an access point;
obtain traffic telemetry data regarding network traffic handled by the access point that is indicative of a type or an activity of clients associated to the access point, wherein the type comprises a device type of a given client and the activity comprises an application or process executing on the given client;
generate, based on the sensor measurements and the traffic telemetry data, a sampling configuration of the environmental sensor of the access point, wherein the sampling configuration controls transitions among power states of the access point; and
cause the access point to collect additional sensor measurements from its environmental sensor according to the sampling configuration.

12. The apparatus as in claim 11, wherein to generate the sampling configuration includes determining an adjustment to a sampling rate or a sampling resolution of the environmental sensor.

13. The apparatus as in claim 11, wherein the traffic telemetry data includes an indication of a type of traffic handled by the access point, wherein the type of traffic is indicative of a type of user activity.

14. The apparatus as in claim 11, wherein the access point comprises the environmental sensor and the environmental sensor is a temperature sensor, a relative humidity sensor, or a gas sensor.

15. The apparatus as in claim 11, wherein the sampling configuration causes the access point to leave a power saving mode when its environmental sensor collects the additional sensor measurements.

16. The apparatus as in claim 11, wherein the traffic telemetry data is indicative of a number of clients associated to the access point.

17. The apparatus as in claim 11, wherein the sampling configuration causes the access point to reduce a sampling rate of its environmental sensor and is based further on a correlation between the sensor measurements obtained from the access point and sensor measurements from one or more access points within a defined proximity of the access point.

18. The apparatus as in claim 17, wherein the sampling configuration causes the access point to increase a sampling rate of its environmental sensor and is based further on an event detected by another access point within a defined proximity of the access point.

19. The apparatus as in claim 11, further comprising:
determining that the sensor measurements are anomalous and providing an indication that the sensor measurements are anomalous to a user interface.

20. A tangible, non-transitory, computer-readable medium storing program instructions that cause a device to execute a process comprising:
obtaining, by the device, sensor measurements from an environmental sensor of an access point;
obtaining, by the device, traffic telemetry data regarding network traffic handled by the access point that is indicative of a type or an activity of clients associated to the access point, wherein the type comprises a device type of a given client and the activity comprises an application or process executing on the given client;
generating, by the device and based on the sensor measurements and the traffic telemetry data, a sampling configuration of the environmental sensor of the access point, wherein the sampling configuration controls transitions among power states of the access point; and
causing, by the device, the access point to collect additional sensor measurements from its environmental sensor according to the sampling configuration.

* * * * *